United States Patent
Jeon et al.

(10) Patent No.: US 11,318,821 B2
(45) Date of Patent: May 3, 2022

(54) DOOR FOR VEHICLE

(71) Applicants: HYUNDAI MOTOR COMPANY, Seoul (KR); KIA MOTORS CORPORATION, Seoul (KR); DUCKYANG IND. CO., LTD., Ulsan (KR)

(72) Inventors: Dongmin Jeon, Suwon-si (KR); Sae Hoon Oh, Ulsan (KR); Hi Su Cho, Ulsan (KR)

(73) Assignees: HYUNDAI MOTOR COMPANY, Seoul (KR); KIA MOTORS CORPORATION, Seoul (KR); DUCKYANG IND. CO., LTD., Ulsan (KR)

( * ) Notice: Subject to any disclaimer, the term of this patent is extended or adjusted under 35 U.S.C. 154(b) by 170 days.

(21) Appl. No.: 16/872,919

(22) Filed: May 12, 2020

(65) Prior Publication Data
US 2021/0206245 A1   Jul. 8, 2021

(30) Foreign Application Priority Data
Jan. 2, 2020   (KR) .................... 10-2020-0000130

(51) Int. Cl.
*B60J 5/04*   (2006.01)

(52) U.S. Cl.
CPC ........... *B60J 5/0484* (2013.01); *B60J 5/0402* (2013.01); *B60J 5/0405* (2013.01)

(58) Field of Classification Search
CPC ...... B60J 5/0455; B60J 5/0463; B60J 5/0481; B60J 5/0402; B60J 5/0405; B60J 5/0408; B60J 5/0413; B60J 5/0416; B60J 5/0484; B29C 45/1671
See application file for complete search history.

(56) References Cited

U.S. PATENT DOCUMENTS

| 4,945,682 A   * | 8/1990 | Altman | B60J 5/0405 296/146.5 |
| 6,941,719 B2 * | 9/2005 | Busseuil | B62D 25/00 296/187.02 |
| 10,730,369 B2 * | 8/2020 | Jeon | B60J 5/0402 |
| 2002/0167195 A1 * | 11/2002 | Nagel | B60J 5/0416 296/146.5 |
| 2004/0049989 A1 * | 3/2004 | Florentin | B60J 5/0463 49/502 |

(Continued)

FOREIGN PATENT DOCUMENTS

KR   2019-0068672 A   6/2019

*Primary Examiner* — Justin B Rephann
(74) *Attorney, Agent, or Firm* — McDonnell Boehnen Hulbert & Berghoff LLP

(57) ABSTRACT

A vehicle door enables introduction of a plastic resin through penetration holes formed in the reinforcement bracket that is inserted into the window frame portion in injection molding of the door module assembled between the door trip and the door panel to improve structural bonding force and at the same time assure structural rigidity by forming various ribs and bosses to thereby prevent separation of the reinforcement bracket due to torsion, and particularly, prevents deformation by strengthening bending strength by filling a plastic resin in a space formed between ribs in a portion where structural strength is required.

13 Claims, 8 Drawing Sheets

(56) References Cited

U.S. PATENT DOCUMENTS

| | | | |
|---|---|---|---|
| 2005/0202223 A1* | 9/2005 | Harima | B60J 5/107 |
| | | | 428/292.1 |
| 2007/0220812 A1* | 9/2007 | Valentage | B60J 5/0416 |
| | | | 49/502 |
| 2013/0057018 A1* | 3/2013 | Reese | B60J 5/042 |
| | | | 296/146.6 |
| 2013/0097932 A1* | 4/2013 | Kriese | E05F 11/481 |
| | | | 49/376 |
| 2017/0008567 A1* | 1/2017 | Kim | B62D 29/004 |
| 2017/0274838 A1* | 9/2017 | Kim | B29C 45/14786 |
| 2018/0056760 A1* | 3/2018 | Hummer | B60J 5/0426 |

\* cited by examiner

FIG. 5
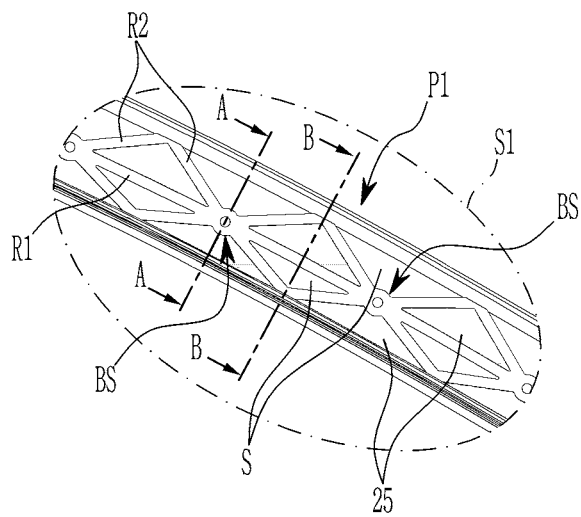
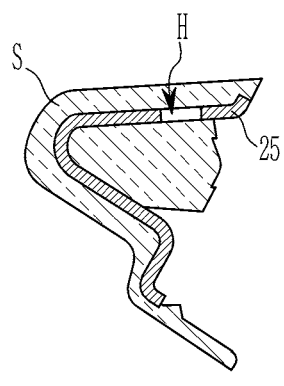
B-B
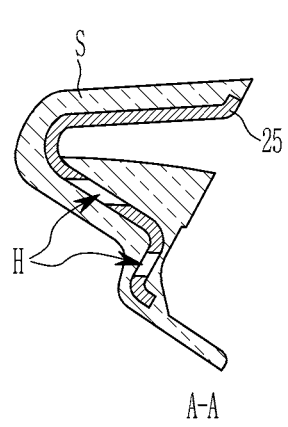
A-A

FIG. 7
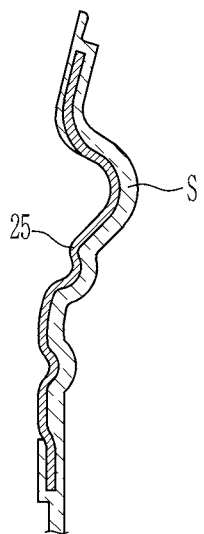
E-E
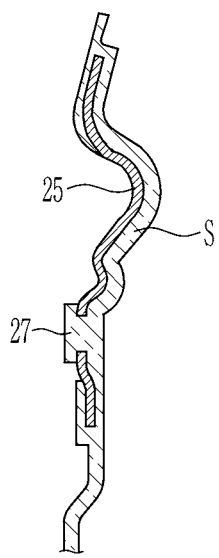
F-F

DOOR FOR VEHICLE

CROSS-REFERENCE TO RELATED APPLICATION

This application claims priority to and the benefit of Korean Patent Application No. 10-2020-0000130 filed in the Korean Intellectual Property Office on Jan. 2, 2020, the entire contents of which are incorporated herein by reference.

BACKGROUND

(a) Field

The present disclosure relates to a door for a vehicle. More particularly, the present disclosure relates to a door for a vehicle in which a reinforcement bracket is insert-molded to a window frame portion of a door module assembled between a door trim and a door panel to increase structural strength.

(b) Description of the Related Art

In general, a door for a vehicle is provided with door glass to improve ventilation, occupant visibility, and habitability in the interior of the vehicle cabin, and is manufactured of a steel material or an aluminum material in consideration of collision safety.

A door outer panel and a door inner panel formed of such a steel or aluminum material are coupled with each other to form a door frame such that a door panel is formed, and a window frame is coupled to the door panel.

A glass module where a guider for lifting and lowering the door glass, an actuator, and the like are mounted is embedded in an internal space formed by coupling the door outer panel and the door inner panel In addition, the door trim where a door latch, a window switch, and the like are installed is coupled to the door inner panel, and an impact beam is installed corresponding to the door outer panel to increase side collision strength of the door.

The conventional vehicle door constructed in this way increases the weight of the overall door as the window frame and glass module guider assembled to the door inner panel are made of steel, and there is a drawback of an increase of the production work and the number of parts as the window frame and glass module are manufactured separately.

On the other hand, in recent years, as in the prior art below, more innovative vehicle doors are being developed through reduction of the number of parts of the door and weight reduction of materials.

The vehicle door disclosed in Korean Patent Laid-Open Publication No. 10-2019-0068672 (Publication Date: 2019 Jun. 19) can reduce the number of parts of the door by modularizing a plurality of parts, and can reduce the weight by making some door modules using a relatively lightweight material instead of using a steel material.

In addition, the prior art aims to help reduce the amount of assembly work and cost, and thus includes a first door module formed of a door outer panel, a door inner panel, a door frame, and an impact beam, a second door module formed of a lightweight material, and a door trim as a third door module.

The door outer panel is disposed outside the vehicle cabin and is formed into a complete panel shape in consideration of door strength and external appearance, while the door inner panel is disposed inside the vehicle cabin and has an opening in a center to reduce weight and cost.

The second door module is formed of a relatively lightweight material, for example, a plastic material, compared to the first door module, and a module body having a panel shape and a window frame portion forming a door window are integrally formed.

However, in the vehicle door of the prior art as described above, the window frame portion, which is the door window portion, is formed of a lightweight plastic composite material together with the module body, and thus a reinforcement bracket such as steel or other non-ferrous metal needs to be insert-molded for strength reinforcement.

Accordingly, there is a drawback in which the engaging force between the window frame portion formed of a composite material and the reinforcement bracket formed of the steel or non-ferrous metal is reduced due to the heterogeneity of the material therebetween.

In particular, there is a drawback in which when a torsional force or bending force due to an external force acts on the window frame portion, the reinforcement bracket insert-molded therein is separated or detached from the window frame portion.

The above information disclosed in this Background section is only for enhancement of understanding of the background of the disclosure, and therefore it may contain information that does not form the prior art that is already known in this country to a person of ordinary skill in the art.

SUMMARY

An exemplary embodiment of the present disclosure provides a vehicle door that enables introduction of a plastic resin through penetration holes formed in the reinforcement bracket that is inserted into the window frame portion in injection molding of the door module assembled between the door trip and the door panel to improve structural bonding force and at the same time assure structural rigidity by forming various ribs and bosses to thereby prevent separation of the reinforcement bracket due to torsion.

In addition, another object of the present disclosure is to provide a vehicle door that prevents deformation by strengthening bending strength by filling a plastic resin in a space formed between ribs in a portion where structural strength is required.

In order to achieve such an object, a vehicle door according to an exemplary embodiment of the present disclosure includes a door panel formed by bonding a door outer panel and a door inner panel, a door module in which a module body portion and a window frame portion are integrally injection-molded and coupled to an inner side of the door inner panel, and a door trim coupled to an inner side of the door module, wherein the window frame portion includes a window glass frame part that supports a window glass, a quarter glass upper frame part that supports a quarter glass; a quarter glass front frame part that supports a front end of the quarter glass, an inside belt frame part where an inside belt is assembled, and a pillar frame part that guides lifting and lowering of the window glass, wherein the window frame portion is injection-molded while a reinforcement bracket is integrally inserted therein, excluding the inside belt frame part, the window glass frame part, the quarter glass upper frame part, the quarter glass front frame part, and the pillar frame part are filled with a plastic resin through a plurality of penetration holes formed in the reinforcement bracket, and at the same time, the reinforcement bracket is injection-molded so as to be fixed by a plurality of rib structures, the plastic resin is insert-injection molded in the inside belt frame part such that an upper end and a lower end of the reinforcement bracket are partially surrounded at the inside of the module body portion, the plastic resin injected through at least one of the penetration holes formed in the reinforcement bracket at a location corresponding to the inside belt frame part forms a fixed end in the penetration hole such that the module body portion and the reinforcement bracket are coupled, and the plastic resin is injection-molded such that an inner side of the reinforcement bracket located in the inside belt frame part is exposed.

The reinforcement bracket may be formed of a press molded product of steel or a non-ferrous metal.

The window glass frame part may include a first horizontal rib that protrudes along a length direction in an inner side of the window glass frame part, and a plurality of first inclined ribs that obliquely protrude while bi-directionally crossing the horizontal rib with reference to the horizontal rib, and are continuously formed along the horizontal rib.

In the window glass frame part, an intersection may be formed at a place where two of the first inclined ribs cross in a diagonal direction on the first horizontal rib, and a circular-shaped boss is formed in the intersection.

Spaces partitioned by the first horizontal rib and the two first inclined ribs may be formed in the window glass frame part, and a plastic resin fills an upper portion and a lower portion with reference the first horizontal rib along a length direction through intersection injection molding such that the reinforcement bracket may not be partially exposed.

The quarter glass upper frame part may include a second horizontal rib that protrudes along a length direction from an inner side of the quarter glass upper frame part, and a plurality of second inclined ribs that obliquely protrude while bi-directionally crossing at the second horizontal rib with reference to the second horizontal rib, and are continuously formed along the second horizontal rib.

In the quarter glass upper frame part, an intersection may be formed at a place where two of the second inclined ribs cross in a diagonal direction on the second horizontal rib, and a circular-shaped boss may be formed in the intersection.

Spaces partitioned by the second horizontal rib and the two second inclined ribs may be formed in the quarter glass upper frame part, and the spaces may be filled with a plastic resin through injection molding such that the reinforcement bracket is not exposed.

The quarter glass front frame part may include a lattice rib that protrudes in a quadrangular-shaped lattice pattern in an inner side thereof.

Spaces partitioned by the lattice ribs may be formed in the quarter glass front frame part, and a plastic resin may partially fill the spaces through injection molding such that the reinforcement bracket may not be partially exposed.

The pillar frame part may include a vertical rib that protrudes along a length direction in an inner side, a plurality of third inclined ribs that obliquely protrude while bi-directionally crossing at a lower portion of the vertical rib, and a plurality of third horizontal ribs that protrude while crossing in a horizontal direction at an upper portion of the vertical rib.

In the pillar frame part, lower opposite ends of the reinforcement bracket may be fixed to the window frame portion by being inserted into the window frame portion, and an inner side of the reinforcement bracket may be injection-molded such that the inner side of the reinforcement bracket may be exposed while being supported by the vertical rib, the third inclined rib, and the third horizontal rib.

The window frame may further include a pillar edge frame part that is formed of only a plastic resin such that the window glass frame part and the pillar frame part may be connected with each other, and may be injection-molded by forming an edge rib protruding toward an inner side thereof.

A vehicle door according to the exemplary embodiment of the present disclosure enables introduction of a plastic resin through penetration holes formed in the reinforcement bracket that is inserted into the window frame portion in injection molding of the door module assembled between the door trip and the door panel to improve structural bonding force and at the same time assure structural rigidity by forming various ribs and bosses to enhance bending and torsional strength.

In addition, the present disclosure can prevent the reinforcement bracket from being separated from or detached from the window frame portion by improving the structural bonding force.

In the present disclosure, the bending strength can be enhanced and deformation due to external force can be prevented by filling a plastic resin in a space formed between each rib in a portion where structural strength is required.

BRIEF DESCRIPTION OF THE DRAWINGS

FIG. 5 is an enlarged view of the portion S1 in FIG. 4 and a cross-sectional view taken along the lines A-A and B-B.

FIG. 7 is a cross-sectional view of FIG. 4, taken along the lines E-E and F-F.

DETAILED DESCRIPTION

Figure 1:
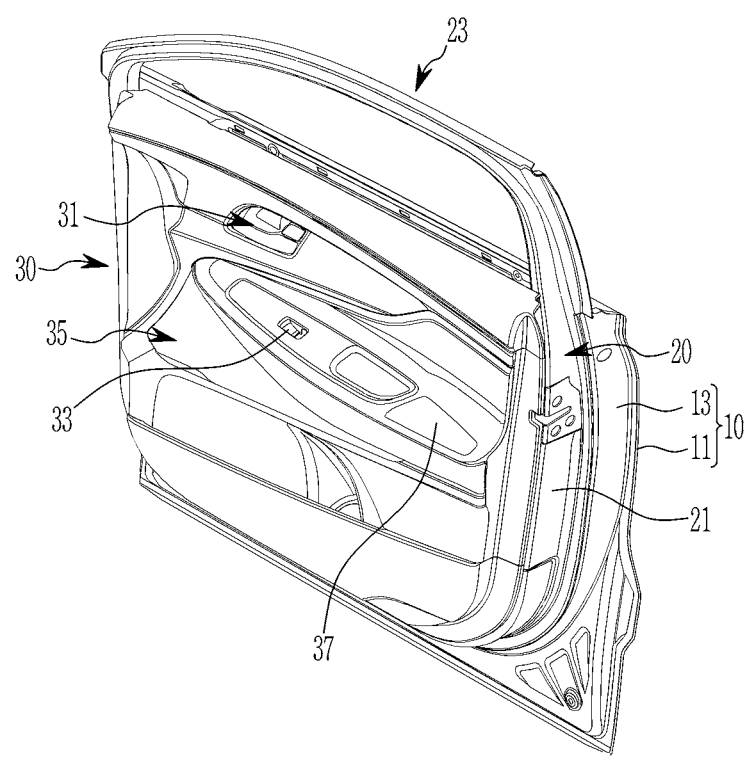
FIG. 1 is a perspective view of a vehicle door according to an exemplary embodiment of the present disclosure.

The present disclosure will be described more fully hereinafter with reference to the accompanying drawings, in which the exemplary embodiment of the disclosure is shown. As those skilled in the art would realize, the described embodiment may be modified in various different ways, all without departing from the spirit or scope of the present disclosure.

The drawings and description are to be regarded as illustrative in nature and not restrictive, and like reference numerals designate like elements throughout the specification.

However, parts which are not related with the description are omitted for clearly describing the exemplary embodiment of the present disclosure, and like reference numerals refer to like or similar elements throughout the specification.

In the following description, dividing names of components into first, second, and the like is to divide the names because the names of the components are the same, and an order thereof is not particularly limited.

In addition, unless explicitly described to the contrary, the word "comprise", and variations such as "comprises" or "comprising" will be understood to imply the inclusion of stated elements but not the exclusion of any other elements.

Figure 2:
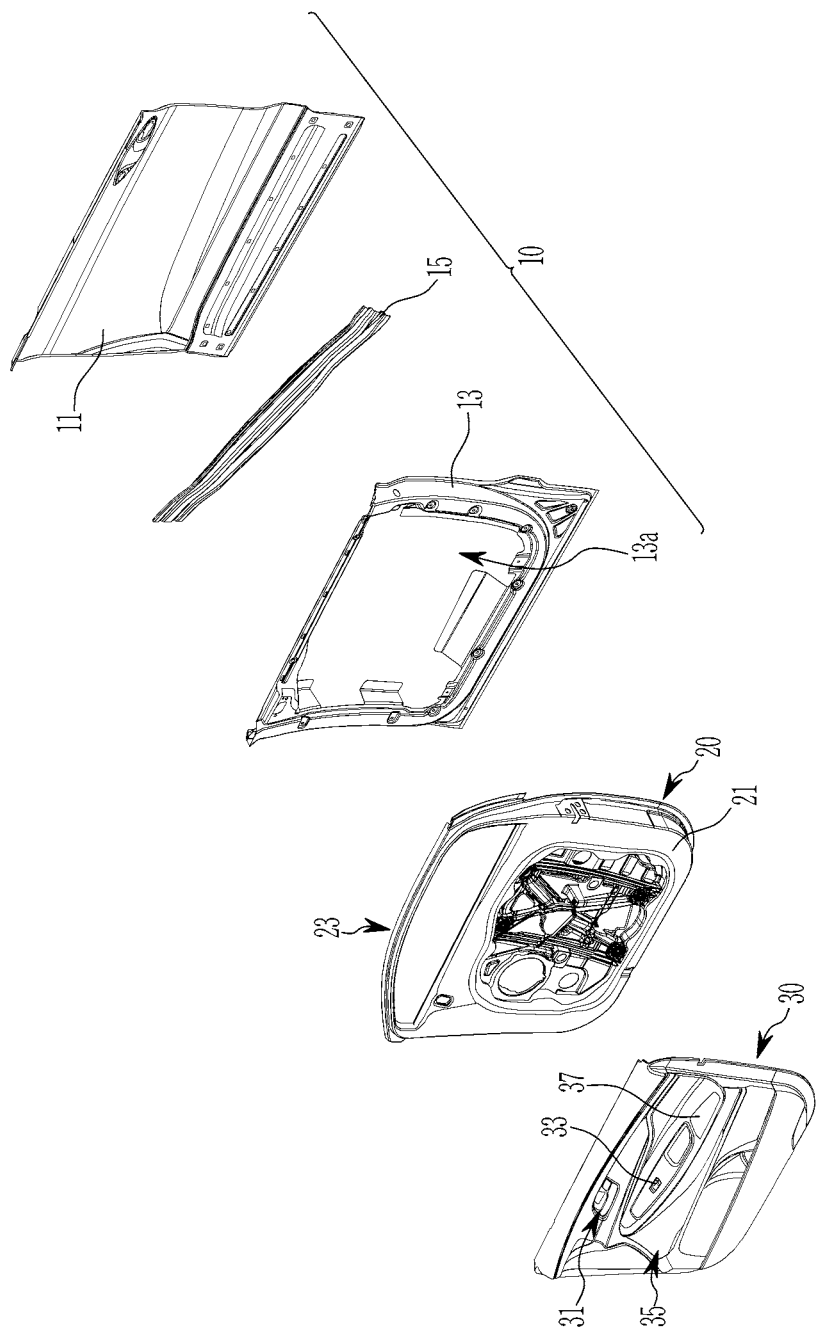
FIG. 2 is an exploded perspective view of the vehicle door according to the exemplary embodiment of the present disclosure.
Figure 3:
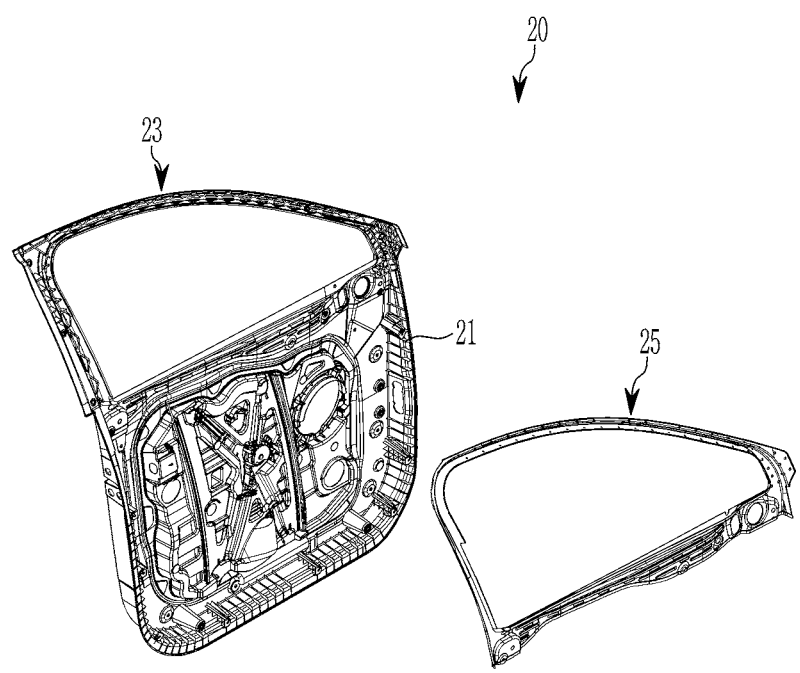
FIG. 3 is an exploded perspective view of a door module and a reinforcement bracket in the vehicle door according to the exemplary embodiment of the present disclosure.

FIG. 1 is a perspective view of a vehicle door according to an exemplary embodiment of the present disclosure, FIG. 2 is an exploded perspective view of the vehicle door according to the exemplary embodiment of the present disclosure, and FIG. 3 is an exploded perspective view of a door module and a reinforcement bracket in the vehicle door according to the exemplary embodiment of the present disclosure.

Referring to FIG. 1 to FIG. 3, a vehicle door according to an exemplary embodiment of the present disclosure includes a door panel 10, a door module 20, and a door trim 30.

The door panel 10 is formed of a door outer panel 11, a door inner panel 13, and an impact beam 15.

The door outer panel 11 is disposed at an outer side of a vehicle body, and is formed in the shape of a whole panel in consideration of door strength and external appearance. The door inner panel 13 is disposed at an inner side of the vehicle cabin, and an opening 13a is formed in a center thereto to reduce the weight and cost.

The door outer panel 11 and the door inner panel 13 may be formed of a metallic material such as steel.

The impact beam 15 is disposed corresponding to the door outer panel 11, and opposite ends thereof are bonded to the door inner panel 13. Such an impact beam 15 can protect an occupant inside the vehicle cabin by absorbing an impact in a side collision of the vehicle.

As described, edges of the door inner panel 13 and the door outer panel 11 are respectively coupled through a process such as hemming while opposite ends of the impact beam 15 are bonded to the door inner panel 13 such that the door panel 10 can be completed.

The door module 20 may be manufactured by insert-injection molding an integrated reinforcement bracket made of steel or a nonferrous metal into a complex material formed of a light-weighted plastic resin and the like.

Referring to FIG. 3, in the door module 20, a panel-shaped module body portion 21 and a window frame portion 23 that guides a door glass (not shown) are integrally injection-molded.

That is, the window frame portion 23 may be fixed with the module body portion 21 by insert injection molding with the reinforcement bracket 25 inside, during injection molding to secure structural strength.

Such a door module 20 is coupled with the door inner panel 13 of the door panel 10.

A lifting or lowering unit such as for a door glass (not shown), an actuator (not shown), a wire (not shown), a guider (not shown), and the like are formed in the inner space formed between the door module 20 and the door inner panel 13 to open and close the door glass (not shown) with respect to the window frame.

Referring to FIG. 2, the door trim 30 is coupled to the door module 20 through a coupling unit, and may serve to function as soundproofing, sound absorbing, and occupant protection in case of collision as well as interior decoration.

In addition, the door trim 30 is configured with convenience items such as a door lock 31, a window switch 33, a speaker 35, and an arm rest 37 may be integrally molded.

Figure 4:
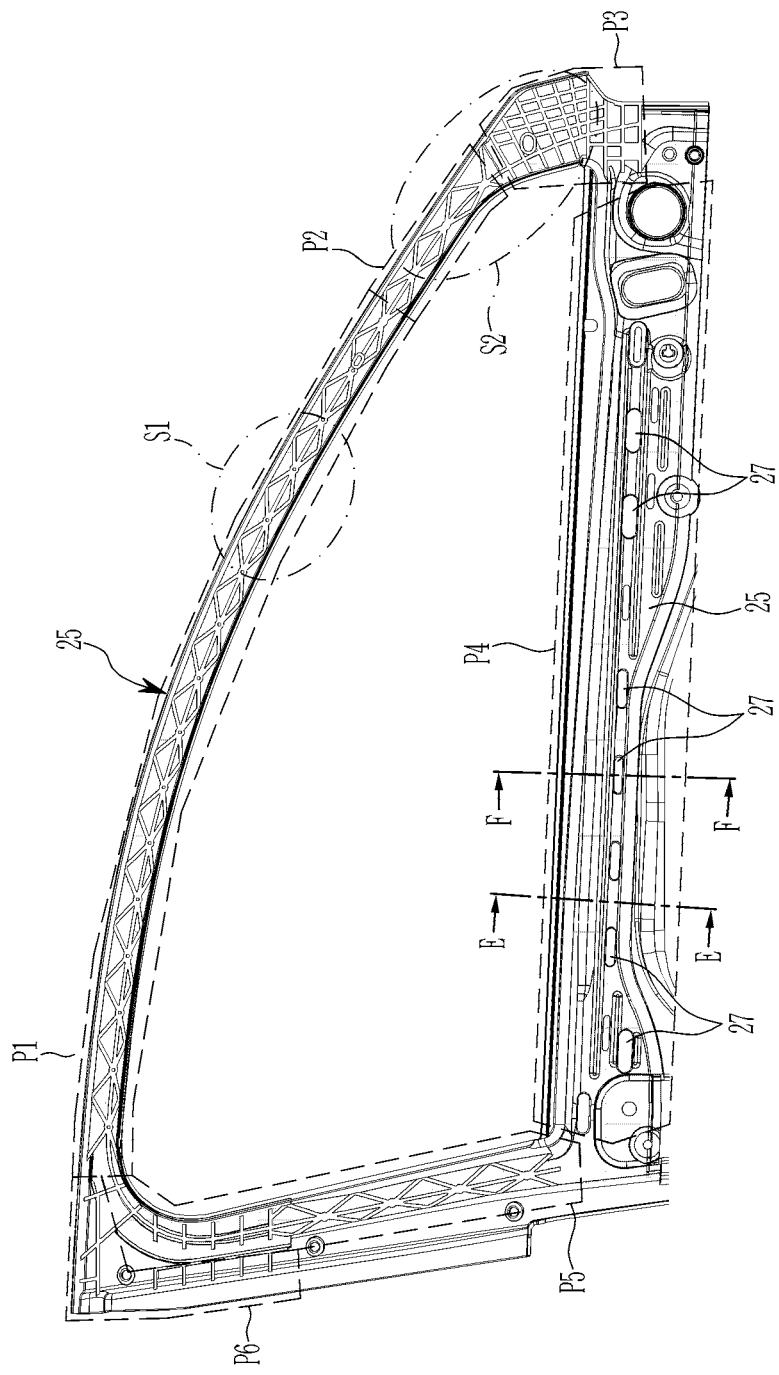
FIG. 4 is an enlarged view of a window frame of the vehicle door according to the exemplary embodiment of the present disclosure.
Figure 6:
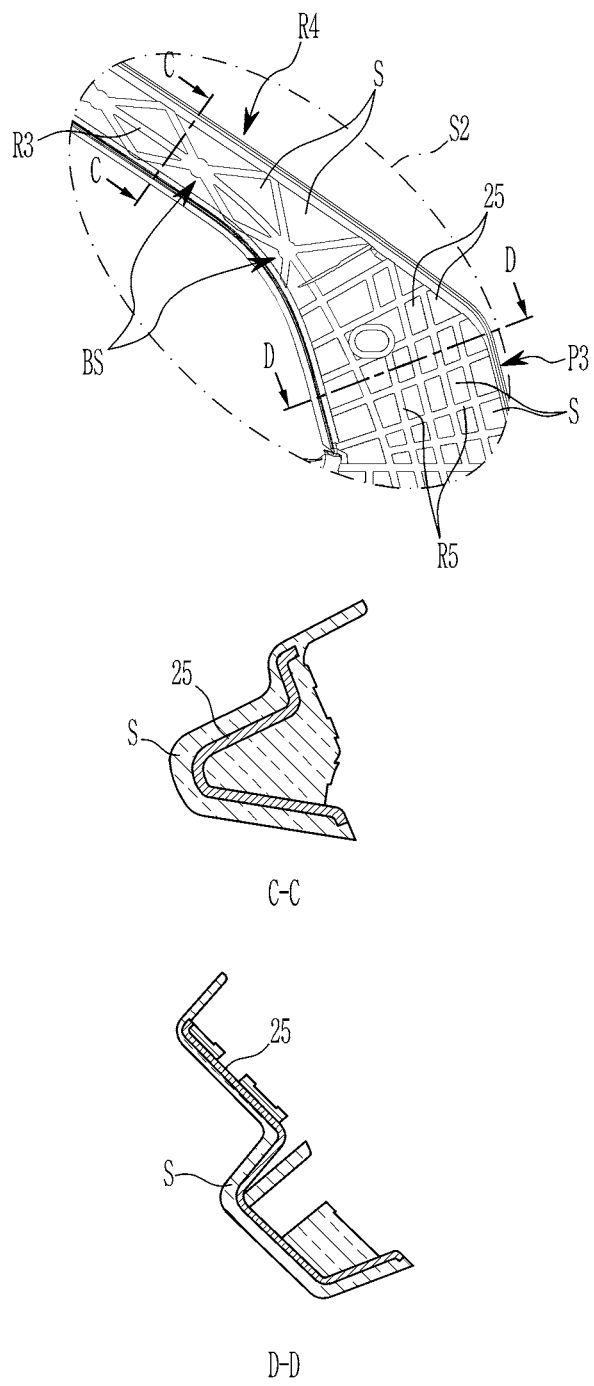
FIG. 6 is an enlarged view of the portion S2 in FIG. 4, and a cross-sectional view taken along the lines C-C and D-D.
Figure 8:
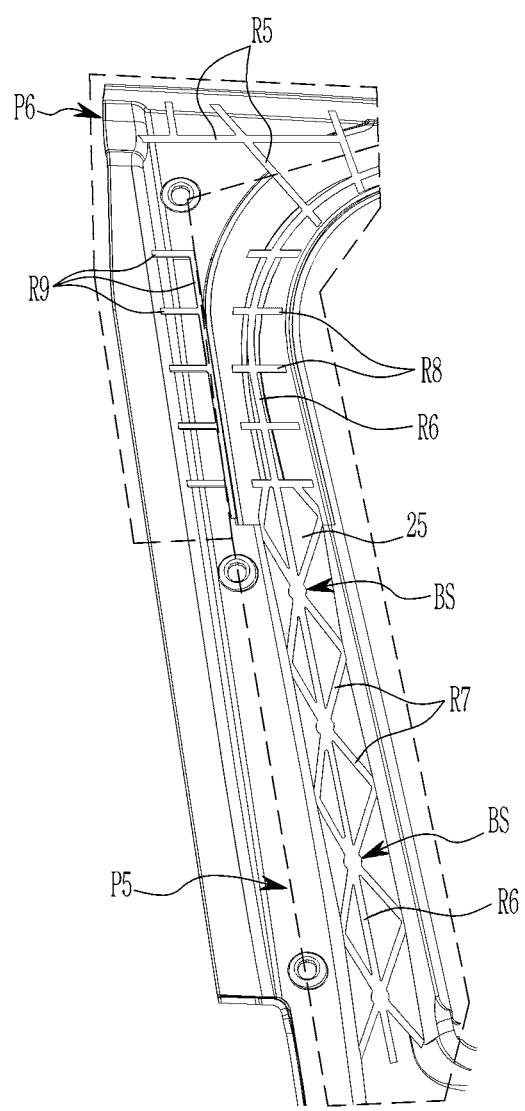
FIG. 8 is an enlarged view of the portions P5 and P6 in FIG. 4.

FIG. 4 is an enlarged view of the window frame of the door module of the vehicle door according to the exemplary embodiment of the present disclosure, FIG. 5 is a cross-sectional view of the portion S1 in FIG. 4 and a cross-sectional view of FIG. 4, taken along the lines A-A and B-B, FIG. 6 is an enlarged view of the portion S2 of FIG. 4 and a cross-sectional view of FIG. 4, taken along the lines C-C and D-D, FIG. 7 is a cross-sectional view of FIG. 4, taken along the lines E-E and F-F, and FIG. 8 is an enlarged view of the parts P5 and P6 of FIG. 4.

In the vehicle door according to the exemplary embodiment of the present disclosure, the door module 20 is formed of a module body portion 21 and a window frame portion 23.

First, the reinforcement bracket 25 is integrally insert-injection molded into the window frame 23, and may be fixed to the module body portion 21.

The reinforcement bracket 25 may be formed of a press molded product of steel or a non-ferrous metal. A plurality of penetration holes H may be formed on a cross-section of the reinforcement bracket 25 for inflow of a plastic resin S.

Referring to FIG. 4, the window frame portion 23 is plastic-injection molded while inserting the reinforcement bracket 25 into the window frame 23.

Here, various ribs R1, R2, R3, R4, and R5 and bosses BS, shown in FIG. 5, are formed in respective parts P1, P2, P3, P4, P5, and P6 of the window frame portion 23.

The plastic resin S selectively filled in the ribs R1, R2, R3, R4, and R5, the bosses BS, and spaces formed between the ribs R1, R2, R3, R4, and R5 may enhance coupling force and structural strength of the window frame portion 23 and the reinforcement bracket 25.

First, the window frame portion 23 includes a window glass frame part P1, a quarter glass upper frame part P2, a quarter glass front frame part P3, an inside belt frame part P4, a pillar frame part P5, and a pillar edge frame part P6.

Referring to FIG. 5, the window glass frame part P1 is a port that supports an upper portion of the window glass when the window glass is lifted.

Such a window glass frame part P1 may include a first horizontal rib R1 that protrudes along a length direction in an inner surface, facing the inside of the vehicle cabin, and a plurality of first inclined ribs R2 that are continuously formed along the first horizontal rib R1 and protrude obliquely while crossing in the shape of an "X" in the first horizontal rib R1.

Here, an end of each of the first inclined ribs R2 is connected with an end of each of the first inclined ribs R2 in different neighboring directions. The first inclined rib R2 may form triangular spaces inside the upper and lower portions with reference to the first horizontal rib R1 together with the first horizontal rib R1.

In addition, in the window glass frame part P1, an intersection is formed at a point where two of the first inclined ribs R2 cross in a diagonal direction on the first horizontal rib R1, and a circular boss BS can be integrally formed at the intersection.

In addition, the plastic resin S may be filled through intersection-injection molding along the length direction in the upper portion and the lower portion with reference to the first horizontal rib R1 so that the reinforcement bracket 25 can be prevented from being partially exposed among the triangular spaces partitioned by the first horizontal rib R1 and the two first inclined ribs R2.

Accordingly, the reinforcement bracket 25 may be exposed to the outside through the remaining spaces which are not filled with the plastic resin S.

As described, the window glass frame part P1 can reinforce its strength and coupling force with the reinforcement bracket 25 since the plastic resin S is partially injection-molded in the spaces through the penetration hole H formed in the first horizontal rib R1, the first inclined rib R2, the boss BS, and the reinforcement bracket 25.

That is, the first horizontal rib R1 reinforces bending strength with respect to the length direction thereof, and a pair of first inclined ribs R2 formed in plural to continuously form the "X" shape reinforces torsional force with respect to a rotation direction such that the overall strength of the window glass frame part P1 can be reinforced.

Referring to FIG. 6, the quarter glass upper frame part P2 is a portion that supports an upper portion of the quarter glass (not shown).

Such a quarter glass upper frame part P2 includes a second horizontal rib R3 protruded along the length direction on the inner side facing the inside of the vehicle cabin, and may include a plurality of second inclined ribs R4 that are protruded obliquely while crossing in the shape of an "X" in the second horizontal rib R3 and continuously formed along the second horizontal rib R3.

Here, an end of each of the second inclined ribs R4 is connected with an end of each of the second inclined ribs R4 in different neighboring directions. The second inclined rib R4 may form triangular spaces inside the upper and lower portions with reference to the second horizontal rib R3, together with the second horizontal rib R3.

In addition, in the quarter glass upper frame part P2, an intersection is formed at a point where the two second inclined ribs R4 cross in the diagonal direction on the second horizontal rib R3, and a circular boss BS may be integrally formed at the intersection.

In addition, the triangular spaces partitioned by the second horizontal rib R3 and the two second inclined ribs R4 may be filled with the plastic resin S through injection molding such that the reinforcement bracket 25 can be prevented from being exposed.

Since the plastic resin S is injection-molded in the spaces partitioned by the second horizontal rib R3 and the second inclined rib R4, the quarter glass upper frame part P2 can improve strength together with the second horizontal rib R3 and the second inclined rib R4, and can be prevented from undergoing bending deformation.

Referring to FIG. 6, the quarter glass front frame part P3 is a portion that supports a front end portion of quarter glass (not shown).

Such a quarter glass front frame part P3 may include lattice ribs R5 that are formed protruding in a quadrangular-shaped lattice pattern in an inner side that faces the inside the vehicle cabin.

Here, quadrangular-shaped spaces that are partitioned by the lattice ribs R5 are formed in the quarter glass front frame part P3, and some of the spaces may be filled with the plastic resin S through partial injection molding so that the reinforcement bracket 25 is not partially exposed.

As described, since the plastic resin S is partially filled in the quadrangular-shaped lattice ribs R5 and the quadrangular-shaped spaces partitioned by the lattice ribs R5, the quarter glass front frame part P3 can firmly support the window glass frame part P1 and the quarter glass upper frame part P2, and deformation can be prevented.

Referring to FIG. 4 and FIG. 7, the inside belt frame part P4 is a portion where an inside belt (not shown) is assembled.

In the inside belt frame part P4, the plastic resin S may be insert injection molded so as to cover some of the upper and lower portions of the reinforcement bracket 25 within the module body portion 21.

Here, the plastic resin S is insert-injection molded through penetration holes H formed in a plurality of places in the reinforcement bracket 25 along a length direction thereof.

In this case, the plastic resin S may form at least one fixed end 27, interposing the reinforcement bracket 25 such that the fixed end 27 is fixed to the reinforcement bracket 25 while surrounding one side and top and bottom ends of the reinforcement bracket 25.

That is, in the inside belt frame part P4, the module body portion 21, and the reinforcement bracket 25 may be fixed by the fixed ends 27 formed in a plurality of places along the reinforcement bracket 25.

Simultaneously, the plastic resin S is injection-molded in the reinforcement bracket 25 located in the inside belt frame part P4 such that most of the inner side facing the inside of the vehicle cabin is exposed.

The upper and lower ends of the reinforcement bracket 25 are insertion-molded through the plastic resin S inside of the module body portion 21 such the inside belt frame part P4 can be prevented from undergoing bending deformation due to external force.

In addition, the inside belt frame part P4 is fixed by the plurality of the fixed ends 27 such that bending strength can be reinforced, and at the same time, separation of the reinforcement bracket 25 due to product deformation can be prevented.

Referring to FIG. 8, the pillar frame part P5 is a portion that guides lifting and lowering of the window glass (not shown).

Such a pillar frame part P5 may include a vertical rib R6 that protrudes along a length direction in an inner side that faces the inside of the vehicle cabin, a plurality of third inclined ribs R7 obliquely protruded while crossing in the shape of an "X" in a lower portion of the vertical rib R6 and continuously formed along the vertical rib R6, and a plurality of third horizontal ribs R8 protruding while crossing the vertical rib R6 in a horizontal direction in an upper portion of the vertical rib R6.

Here, lower opposite ends of the reinforcement bracket 25 may be fixed to the pillar frame part P5 while being inserted into the window frame portion 23.

In addition, the inner side facing the interior of the cabin in the pillar frame part P5 can be injection molded to be exposed outside while supported by the vertical rib R6, the third inclined rib R7, and the third horizontal rib R8.

Accordingly, the strength of the pillar frame part P5 with respect to the height direction of the vehicle can be reinforced by the vertical rib R6, and strength of the vehicle body can be enhanced by the third inclined rib R7 and the third horizontal rib R8.

Referring to FIG. 8, the pillar edge frame part P6 is a portion that connects the window glass frame part P1 and the pillar frame part P5.

Such a pillar edge frame part P6 may be injection-molded through the plastic resin S such that the window glass frame part P1 and the pillar frame part P5 can be connected to each other.

That is, the pillar edge frame part P6 is formed of only a plastic resin S.

Here, the pillar edge frame part P6 may further include an edge rib R9 that protrudes toward the inner side facing the interior of the vehicle cabin.

The edge rib R9 is formed at an upper end portion corresponding to the door pillar (not shown), and may reinforce strength of a door edge portion.

As described, the vehicle door having the above-described structure according to the exemplary embodiment of the present disclosure enables inflow of the plastic resin S through the penetration hole H formed in the reinforcement bracket 25, which is inserted into the window frame portion 23, during injection molding of the door module 20 assembled between the door trim 30 and the door panel 10, and thus structural bonding force can be improved.

In addition, various ribs R1, R2, R3, R4, R5, R6, R7, R8, and R9 are formed in the horizontal direction, the vertical direction, and the diagonal direction for each of the parts P1, P2, P3, P4, P5, and P6, and bosses BS are formed in the intersections of the first, second, and third inclined ribs R2, R4, and R7 and the first and second horizontal ribs R1, and R3 or the vertical ribs R6 such that the structural strength can be assured.

Accordingly, the bending and torsional strength can be increased so that the reinforcement bracket 25 can be prevented from being separated or detached from the window frame portion 23.

In addition, the plastic resin S fills in the triangular-shaped or quadrangular-shaped spaces formed between the ribs R1, R2, R3, R4, R5, R6, R7, R8, and R9 at the portions where structural strength is required such that bending can be reinforced and deformation due to external force can be prevented.

While this disclosure has been described in connection with what is presently considered to be a practical exemplary embodiment, it is to be understood that the disclosure is not limited to the disclosed embodiment. On the contrary, it is intended to cover various modifications and equivalent arrangements included within the spirit and scope of the appended claims.

What is claimed is:

1. A vehicle door comprising:
    a door panel formed by bonding a door outer panel and a door inner panel;
    a door module in which a module body portion and a window frame portion are integrally injection-molded and coupled to an inner side of the door inner panel; and
    a door trim coupled to an inner side of the door module, wherein the window frame portion comprises:
        a window glass frame part that supports a window glass;
        a quarter glass upper frame part that supports a quarter glass;
        a quarter glass front frame part that supports a front end of the quarter glass;
        an inside belt frame part where an inside belt is assembled; and
        a pillar frame part that guides lifting and lowering of the window glass,
        wherein the window frame portion is injection-molded while a reinforcement bracket is integrally inserted therein,
    the window glass frame part, the quarter glass upper frame part, the quarter glass front frame part, and the pillar frame part are injection-molded so that the reinforcement bracket is fixed by a plurality of rib structures while a plastic resin is filled through a plurality of through-holes formed in the reinforcement bracket,
    the plastic resin is insert-injection molded in the inside belt frame part such that an upper end and a lower end of the reinforcement bracket are partially surrounded at the inside of the module body portion,
    the plastic resin is injected through at least one of the penetration holes formed in the reinforcement bracket at a location corresponding to the inside belt frame part forms a fixed end in the penetration hole such that the module body portion and the reinforcement bracket are coupled, and
    the plastic resin is injection-molded such that an inner side of the reinforcement bracket located in the inside belt frame part is exposed.

2. The vehicle door of claim 1, wherein the reinforcement bracket is formed from steel or a non-ferrous metal.

3. The vehicle door of claim 1, wherein the window glass frame part comprises:
    a first horizontal rib that protrudes along a length direction in an inner side of the window glass frame part; and
    a plurality of first inclined ribs that obliquely protrude while bi-directionally crossing the horizontal rib, and are continuously formed along the horizontal rib.

4. The vehicle door of claim 3, wherein, in the window glass frame part, an intersection is formed at a place where two of the first inclined ribs cross in a diagonal direction on the first horizontal rib, and a circular-shaped boss is formed in the intersection.

5. The vehicle door of claim 4, wherein spaces partitioned by the first horizontal rib and the two first inclined ribs are formed in the window glass frame part, and
    the plastic resin fills an upper portion and a lower portion of the first horizontal rib along a length direction through intersection injection molding such that the reinforcement bracket is not partially exposed.

6. The door vehicle of claim 1, wherein the quarter glass upper frame part comprises:
    a second horizontal rib that protrudes along a length direction from an inner side of the quarter glass upper frame part; and
    a plurality of second inclined ribs that obliquely protrude while bi-directionally crossing in the second horizontal rib, and are continuously formed along the second horizontal rib.

7. The vehicle door of claim 6, wherein, in the quarter glass upper frame part, an intersection is formed at a place where two of the second inclined ribs cross in a diagonal direction on the second horizontal rib, and a circular-shaped boss is formed in the intersection.

8. The vehicle door of claim 7, wherein spaces partitioned by the second horizontal rib and the two second inclined ribs are formed in the quarter glass upper frame part, and
    the spaces are filled with the plastic resin through injection molding such that the reinforcement bracket is not exposed.

9. The vehicle door of claim 1, wherein the quarter glass front frame part comprises a lattice rib that protrudes in a quadrangular-shaped lattice pattern in an inner side thereof.

10. The vehicle door of claim 9, wherein spaces partitioned by the lattice ribs are formed in the quarter glass front frame part, and
    the plastic resin partially fills the spaces through injection molding such that the reinforcement bracket is not partially exposed.

11. The vehicle door of claim 1, wherein the pillar frame part comprises:
    a vertical rib that protrudes along a length direction in an inner side that faces the inside of the vehicle cabin;
    a plurality of third inclined ribs that obliquely protrude while bi-directionally crossing at a lower portion of the vertical rib; and
    a plurality of third horizontal ribs that protrude while crossing in a horizontal direction at an upper portion of the vertical rib.

12. The vehicle door of claim 11, wherein, in the pillar frame part, lower opposite ends of the reinforcement bracket are fixed to the window frame portion by being inserted into the window frame portion, and an inner side of the reinforcement bracket is injection-molded such that the inner side of the reinforcement bracket is exposed while being supported by the vertical rib, the third inclined ribs, and the third horizontal ribs.

13. The vehicle door of claim 1, wherein the window frame further comprises a pillar edge frame part that is formed of only the plastic resin such that the window glass frame part and the pillar frame part are connected with each other, and is injection-molded by forming an edge rib protruding toward an inner side.

* * * * *